July 8, 1969 M. R. LILLEY 3,454,100
WINDROWING FORK ARRANGEMENT FOR PEANUT DIGGER
Filed Feb. 23, 1967 Sheet 1 of 3

INVENTOR.
Melvin R. Lilley

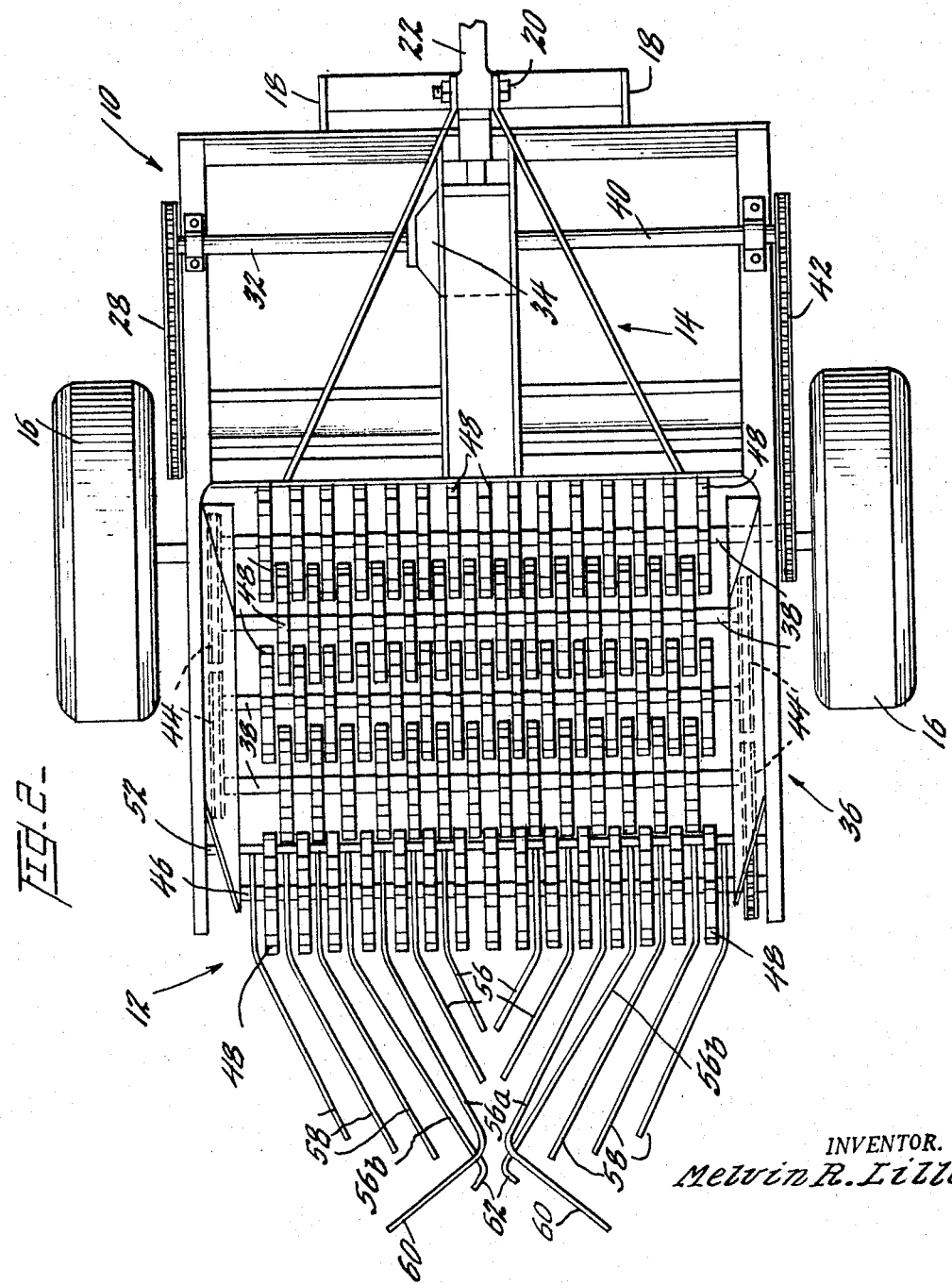

July 8, 1969           M. R. LILLEY           3,454,100
WINDROWING FORK ARRANGEMENT FOR PEANUT DIGGER
Filed Feb. 23, 1967           Sheet 3 of 3
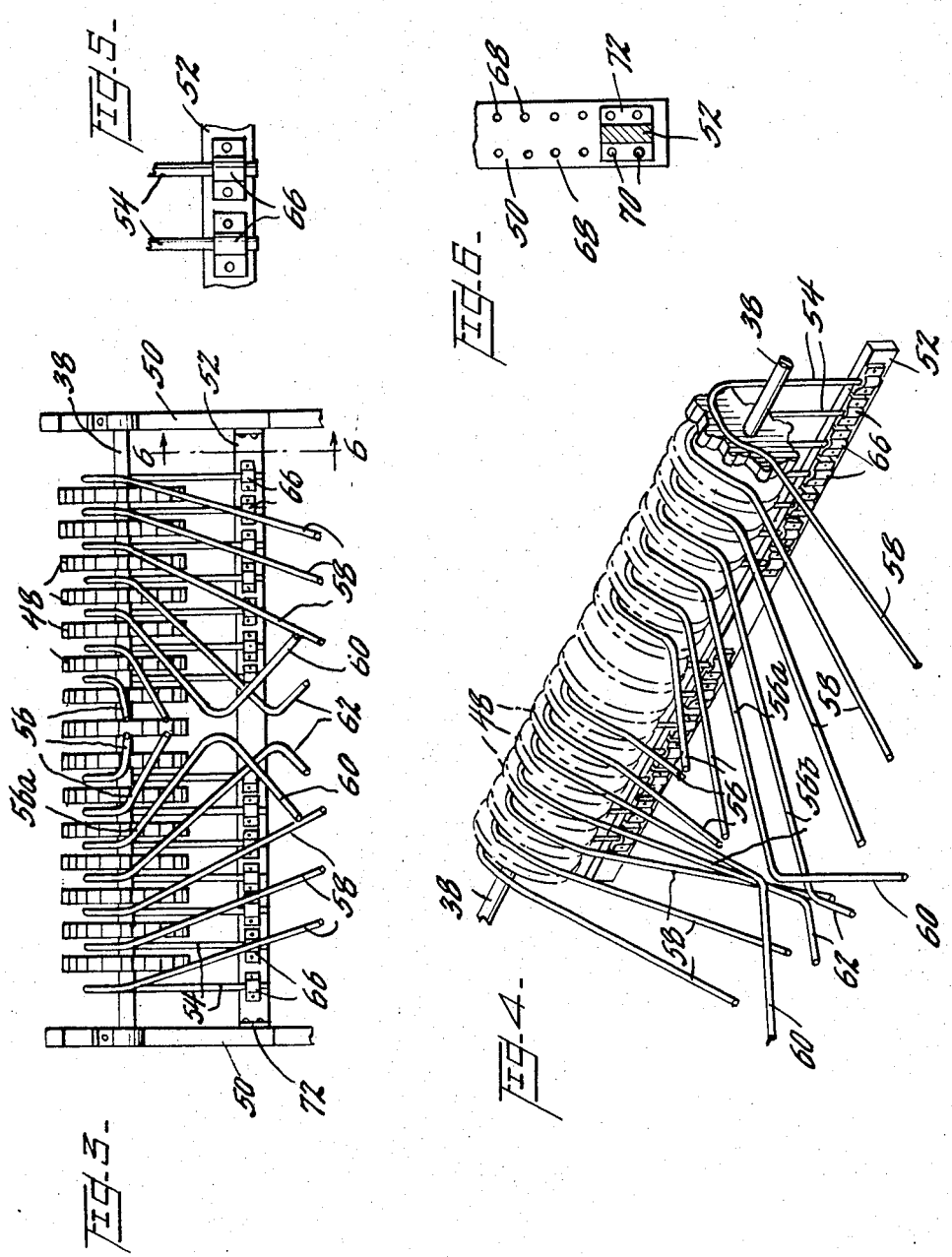
INVENTOR.
Melvin R. Lilley United States Patent Office 3,454,100
Patented July 8, 1969

3,454,100
WINDROWING FORK ARRANGEMENT FOR PEANUT DIGGER
Melvin R. Lilley, Prince George County, Va., assignor to Ferguson Manufacturing Company, Suffolk, Va., a corporation of Virginia
Filed Feb. 23, 1967, Ser. No. 617,869
Int. Cl. A01d 29/00, 57/28, 13/00
U.S. Cl. 171—116                                9 Claims

ABSTRACT OF THE DISCLOSURE

The invention comprises an improved windrowing fork arrangement for a two-row peanut digger including two sets of spring tines arranged behind the shaker mechanism of the digger which serves to shake excess earth from the uprooted peanuts. The tines turn the two rows of uprooted peanuts inwardly approximately 90° so that the peanuts face upwardly for drying on the ground. The spring tines include a lower set directed inwardly and rearwardly of the peanut digger for guiding the peanuts to the ground and an upper set of tines to contact the peanut vines and force them outwardly of the center of the digger, thus turning the vines partially over to form a bed for the peanuts as the uprooted vines and peanuts fall to the ground.

Background of the invention

The invention relates generally to harvesting machinery, and more particularly to the machine harvesting of peanuts. The harvesting of this specific crop presents unusual problems not encountered in the growing and harvesting of other ordinary crops. The peanut is a root crop, but unlike most root crops, it has an extensive vine structure. Since it is impractical and undesirable to remove the uprooted peanuts from the vines at the time of digging, and since it is important to lay the peanuts and vines in windrows so that the peanuts are out of contact with the ground, it is important to have equipment that will do this job quickly and cheaply. At the same time, when the peanuts are harvested, it is important that the operation be carried out with cautious handling of the uprooted peanuts and vines, since peanuts are easily detached from their vines; if so, they will fall to the ground and be lost when the vines are collected for threshing. Thus, this invention comprises a windrowing fork arrangement mounted at the rear of a peanut digging machine which will turn a windrow of vines and attached peanuts as it leaves the digger so that the vines form a bed for the uprooted peanuts to rest upon.

Three patents clearly illustrate the status of known development in the art of peanut harvesting. The first is the patent to Percivall, No. 1,321,326, which indicates a peanut digger having the basic components including an uprooting blade at the forward end of the machine, a conveyor mechanism disposed upwardly and rearwardly of the digging blade which allows earth clinging to the peanuts to fall to the ground, and a fork and basket arrangement at the rear edge of the conveyor to catch the uprooted peanuts and vines and intermittently deposit the same on the ground. A later patent to Carter et al., No. 2,562,659, indicates approximately the same components but the fork arrangement behind the conveyor of this device is adapted to lay the vines and peanuts in a single windrow on the ground. A significant improvement over these two devices is indicated in the patent to Hines, No. 2,997,114 which discloses a positively driven beater between the digging blade and the conveyor which effectively removes most of the earth from the uprooted peanuts before the peanuts and vines reach the conveyor.

However, one significant problem remains in the employment of any of these inventions. That problem is that the peanuts and vines fall to the ground from the peanut digger with the peanuts contacting the ground and the vines on top of the peanuts. This means that a second operation must be undertaken before the peanuts are threshed to remove any remaining earth from the peanuts and to raise the peanuts out of contact with the ground. Invariably, this additional handling of harvested peanuts before threshing causes a significant reduction in expected crop yield because a percentage of peanuts will be detached from their vines by this additional handling. Of greater significance is the possibility of rain between the time the peanuts are harvested and the time that they are reshaken. Since the peanuts are still in contact with the ground, rain will cause the peanuts to sink back into the earth, causing at the least, discoloration of the shell of the peanut, and at worst, rotting of the peanut before it can be threshed, thus resulting in severe loss of the crop.

The present invention overcomes these disadvantages by leaving the peanuts in windrows after harvesting with the vines beneath substantially all of the uprooted peanuts so that the peanuts are out of contact with the ground. Thus, the need for an additional shaking operation before threshing of the peanuts is overcome. Additionally, if a rain comes between the time of harvesting and threshing of the peanuts, such a rain will only tend to wash the remaining earth from the outer shell of the peanut, thus enhancing the appearance of the peanut and will prevent rotting of the peanut from rain, since the peanut is out of contact with the ground. Most importantly, the peanuts will be in a position to be dried effectively by the sun so as to remove much of the moisture in the peanut. This helps increase the price that the farmer will get for his peanut crop. Experimental use of the invention has shown that the peanuts harvested have a moisture content of 9% or less after threshing compared with peanuts harvested by the older methods, where the peanuts are left with approximately 13% moisture content. The price that the farmer gets for his peanuts depends not only on the size and quality of the peanut, but upon the moisture content thereof. Commonly, no deduction in price is made if the moisture content of the crop is less than 9%. At this level of moisture, the crop can be completely dried in an ordinary peanut heating bin in approximately two days time. If the crop has a 13% moisture content, up to six days may be required to dry the peanuts out in the heating bin resulting in greater cost to dry the peanuts. Further, there is a direct relation between the time required to dry the peanuts in a heating bin and the quality and flavor of the processed peanut. Peanuts that have been heated for six days have significantly less quality and flavor than those dried only for a two day period of time.

Summary

The gist of the invention is to provide a spaced series of tines at the rear of the conveying means of a peanut digging machine which first, facilitate a gentle removal of the vines and peanuts from the conveyor, secondly, to construct them of spring steel or like material so that they vibrate by ordinary movement of the peanut digger thus removing clinging earth from the uprooted peanuts and thirdly, to arrange the tines to extend rearwardly from the conveyor and downwardly toward the ground and to further shape them to turn or "flip" the vines gently and substantially beneath the uprooted peanuts so that a windrow is formed with the peanuts above the vines. The invention is of optimum simplicity and is adapted to be attached to a variety of existing peanut diggers.

Brief description of the drawing

Details of construction of the preferred embodiments of the invention will become readily apparent by reference to the following drawings wherein:

FIGURE 2 is a top plan view of the invention as shown in FIGURE 1;

FIGURE 3 is an end view of the invention itself and a minimal portion of the conveying means of the device illustrated in FIGURES 1 and 2;

FIGURE 4 is a view, in perspective, of the invention as illustrated in FIGURE 3;

FIGURE 5 is a partial elevational view of an adjustable support for the tines; and FIGURE 6 is a partial, sectional view taken along lines 6—6 of FIGURE 3.

Description of the preferred embodiments

Figure 1:
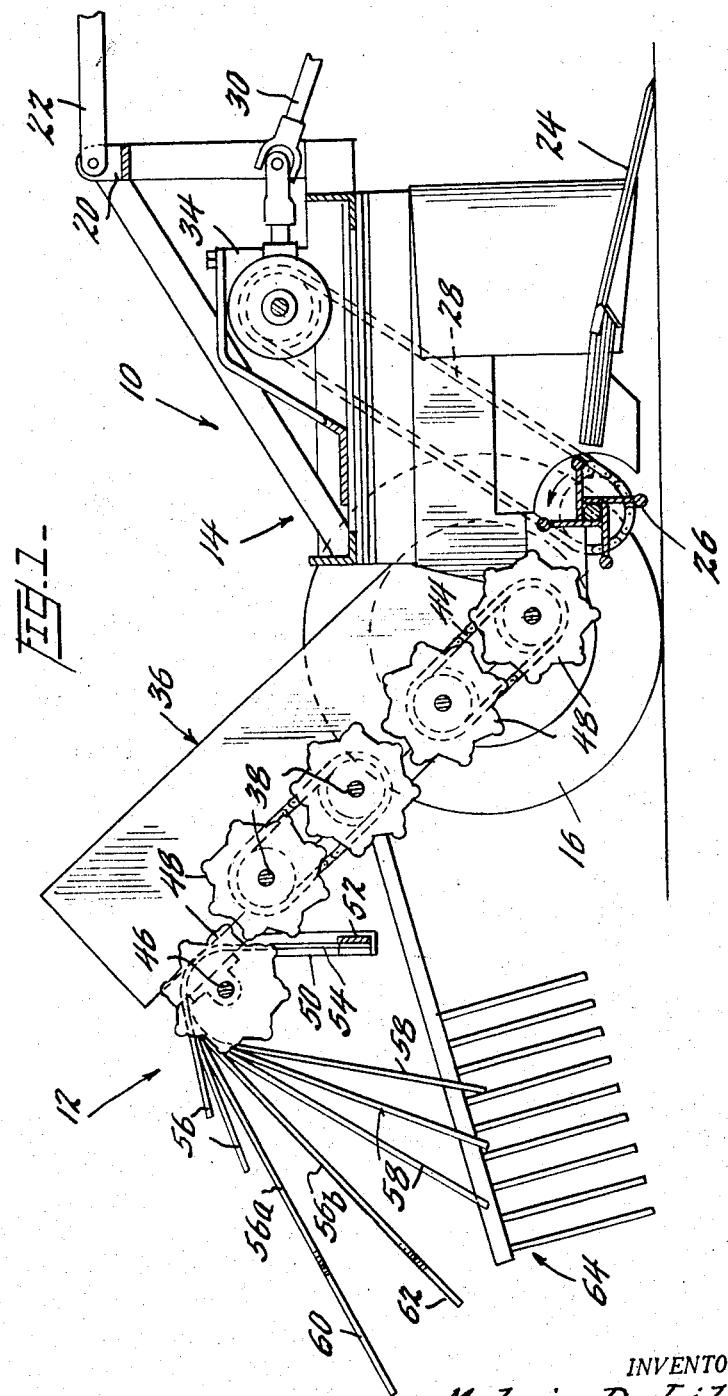
FIGURE 1 is an elevational view of the invention as mounted on a modified peanut digger similar to the one shown by Hines, Pat. No. 2,997,114.

Referring now to the drawings by reference character, and in particular to FIGURES 1 and 2 thereof, there is shown a peanut digger 10 with the invention 12 mounted thereon. Digger 10 comprises a vehicle frame 14 with a pair of wheels 16, 16, mounted thereon for transport of the digger over the ground. The digger is adapted to be pulled by a tractor (not shown); thus the frame 14 is formed, at the forward end of the digger into elements 18, 18 for connection to the draft links of the pulling tractor, and element 20 for connection of a lift link 22 from the tractor. These draft and link connections correspond to the conventional, 3-point, hydraulic-lift type of tractor generally known and used through the United States. The working elements of the digger include a forward, digging blade 24, a rotating beater 26 for removing clumps of earth from the uprooted peanuts and a chain drive 28 for beater 26 connected to power takeoff shaft 30 of the tractor through drive shaft 32 and differential 34. A conveyor 36 is mounted behind beater 26 and is employed to further remove clinging earth from the uprooted peanuts. In this embodiment, the conveyor comprises a plurality of rotating shafts 38, positively driven in the sense of the path of travel of uprooted peanuts and vines through the digger by a second drive shaft 40, secondary drive chain 42 and connecting drive chains 44, disposed alternately from one side of the peanut digger to the other to the rearmost conveyor shaft 46, as illustrated by FIGURE 2. Along each shaft 38 and rear shaft 46 are disposed a plurality of conveying, beater wheels 48 of the type shown and described in the patent to Goodrich, No. 2,311,982.

The invention 12 is shown mounted at the rear of digger 10 in FIGURES 1 and 2 and include depending vertical supports 50, 50 from the conveyor 36, a horizontal support bar 52, between supports 50, 50 and a plurality of tines 54 mounted along the length of horizontal support 52, including an upper, inner set of eight rods 56 and a lower, outer set of six rods 58. As shown by FIGURES 3 and 4, the tines 54 are disposed along horizontal support 52 and each extends first, upwardly, between rear shaft 56 of conveyor 36 and adjacent shaft 38 of conveyor 36, as indicated in FIGURE 1. Each tine 54 is then curved over shaft 46, inwardly of the circumference of wheels 48 and through the spaces defined by adjacent wheels 48 on shaft 46. Digger 10 employed in this embodiment of the invention is adapted to uproot two rows of peanuts simultaneously, one row on each side of the center line of digger 10. Referring to FIGURE 4, as the peanuts and vines leave the conveyor, the bulk of the peanuts will ride on the six outer rods 58 while the bulk of the peanut vines will ride on the eight inner rods 56. It will be noted that all of the rods 56 and 58 are angled inwardly toward the center line of digger 10 so that the peanuts will form two, narrow windrows as they fall to the ground.

The two next-to-outermost upper rods, 56a, 56a, are bent sharply outwardly near their distal ends to form extensions 60, 60, while the two outermost rods 56b, 56b are bent outwardly at their approximate distal ends to form short extensions 62, 62. Thus, as each row of peanuts and vines approaches the distal, free end of rods 56 and rods 58, the vines will contact extensions 60 and 62 on each side of the center of digger 10, thus causing the vines to turn or "flip" outwardly and partially under the peanuts as they fall to the ground. In this embodiment, extension 60 assure a space between the two windrows of peanuts for maximum effective drying of the peanuts.

In a preferred form of the invention, each tine 54 is constructed of spring steel or like material so as to vibrate slightly through natural motion of digger 10 over the ground and thus assist in removing clumps of earth remaining on the uprooted peanuts not removed by conveyor 36.

If desired, additional windrow forks 64, 64 (FIGURE 1) may be provided on each side of and beneath invention 12 to form a single windrow of peanuts and vines from the two rows uprooted by digger 10. Forks 64 may be in the form shown or, alternatively, may be solid plates instead of open forks.

As indicated in FIGURE 5, each tine 54 may be vertically adjustably secured on bar 52 by means of a clamping plate 66 or other convenient arrangement. Additionally, as shown in FIGURE 6, bar 52 may be vertically adjustable by means of selective bores 68 used with bolts 70 through ears 72 on bar 52; any other suitable arrangement may be used.

It is readily apparent from the foregoing that I have invented a new and highly useful device in the art of peanut harvesting machinery, and thus I am not to be limited to the specific embodiments hereinabove described except as may be deemed to be within the scope of the following claims.

I claim:

1. In a peanut digger including means to uproot the peanuts and the vines to which they are attached and conveying means for transfering the uprooted peanuts and associated vines upwardly and rearwardly of the digging means to remove earth from the peanuts, the improvement comprising a windrowing fork arrangement for guiding the uprooted peanuts and vines from the conveyor to the ground including two sets of tines both mounted at the upper rear portion of the conveying means, extending generally rearwardly and jointly distributed across substantially the rear width of the conveying means, the first set including spaced rods arranged to receive the peanuts and vines from the conveying means and rotate a portion of the vines about an axis substantially parallel to the sense of the path of travel of the digger, partially beneath the peanuts and the remaining portion of the vines to form a windrow bed for the peanuts, said second set including spaced rods arranged to convey the peanuts and vines received from the conveying means toward said first set and the earth, behind the digger.

2. The invention of claim 1 wherein said peanut digger is adapted to uproot and convey two rows of peanuts simultaneously, one row on each side of said centerline of said digger, said spaced rods of said second set of tines being angled rearwardly of the digger and inwardly toward the centerline to direct said two rows of uprooted peanuts toward each other as the peanuts are dropped to the ground, said rods of said first set of tines also being angled rearwardly of the digger and inwardly toward the centerline above the rods of said second set of tines to direct the vines of the two rows of uprooted peanuts toward each other, at least two of said rods of the first set of tines being angled sharply outwardly near their distal ends to direct said vines outwardly of the centerline and under the peanuts as the rows drop to the ground and to form a space between the windrows of peanuts to facilitate drying thereof.

3. The invention of claim 2 wherein said second set of tines comprises an even number of rods, an equal number on each side of said centerline, arranged generally below the rods of said first set of tines, said lower rods angled progressively downwardly from the innermost to the outermost with respect to said centerline.

4. The invention of claim 2 wherein said rods of the first set of tines comprise an even number of rods, an equal number each side of said centerline and mounted inwardly of the rods of the second set of tines with respect to said centerline, said inner rods angled progressively downwardly from the innermost to the outermost with respect to said centerline, the two outermost of the inner group of rods being bent outwardly of said centerline at their approximate distal ends, and the two rods next inward of said two outermost of the inward group of rods being bent outwardly of said centerline near their distal ends whereby said rows of uprooted peanuts are rotated approximately 90° outwardly of and substantially parallel to said centerline before dropping to the ground in windrows.

5. The invention of claim 2 wherein two windrow forks are provided, one on each side of and at the rear of said conveying means, beneath said windrowing fork arrangement, for directing said two rows of uprooted peanuts into a single windrow.

6. The invention of claim 1 wherein said tines are provided with a support bar, extending the width of said peanut digger and mounted below the upper rear portion of said conveying means, said support bar being vertically adjustable.

7. The invention of claim 7 wherein said tines are individually vertically adjustable on said support.

8. The invention of claim 1 wherein each of said tines is formed of spring steel to be shakable during movement of said peanut digger in a harvesting operation whereby to remove remaining clods of earth clinging to said uprooted peanuts.

9. The invention of claim 1 wherein said spaced rods of the first set of tines are distributed equally on each side of the centerline of the conveying means of the peanut digger.

References Cited

UNITED STATES PATENTS

| | | | |
|---|---|---|---|
| 2,540,094 | 2/1951 | Brown et al. | 171—61 |
| 3,059,703 | 10/1962 | Pearman | 171—61 |
| 3,083,776 | 4/1963 | Carter et al. | 171—101 |
| 3,106,250 | 10/1963 | Gregory | 171—61 |

ANTONIO F. GUIDA, *Primary Examiner.*

U.S. Cl. X.R.

171—61

Dedication 3,454,100.—*Melvin R. Lilley*, Prince George County, Va. WINDROWING FORK FOR ARRANGEMENT FOR PEANUT DIGGER. Patent dated July 8, 1969. Dedication filed Jan. 14, 1974, by the assignee, *Ferguson Manufacturing Company*.

Hereby dedicates to the Public the remaining term of said patent.

[*Official Gazette May 20, 1975.*]